(12) United States Patent
Watano et al.

(10) Patent No.: US 8,721,167 B2
(45) Date of Patent: May 13, 2014

(54) KNEADING AND GRANULATING MACHINE

(75) Inventors: Satoru Watano, Osaka (JP); Hiroki Oishi, Nara (JP)

(73) Assignees: Shinagawa Machinery Works Co., Ltd. (JP); Satoru Watano (JP)

( * ) Notice: Subject to any disclaimer, the term of this patent is extended or adjusted under 35 U.S.C. 154(b) by 893 days.

(21) Appl. No.: 11/815,252

(22) PCT Filed: Feb. 6, 2006

(86) PCT No.: PCT/JP2006/302672
§ 371 (c)(1),
(2), (4) Date: Nov. 17, 2008

(87) PCT Pub. No.: WO2006/085677
PCT Pub. Date: Aug. 17, 2006

(65) Prior Publication Data
US 2009/0135666 A1  May 28, 2009

(30) Foreign Application Priority Data
Feb. 9, 2005  (JP) ................................. 2005-033473

(51) Int. Cl.
*B01F 7/30*  (2006.01)
*B01F 7/00*  (2006.01)
*B02C 18/00*  (2006.01)
*B01J 2/10*  (2006.01)
*A01K 5/00*  (2006.01)

(52) U.S. Cl.
CPC ... *B01J 2/10* (2013.01); *B01F 7/30* (2013.01); *B01F 7/00208* (2013.01); *B02C 18/00* (2013.01); *A01K 5/002* (2013.01)
USPC ............. 366/288; 366/244; 366/309; 241/98; 241/101.8; 241/123

(58) Field of Classification Search
CPC .......... B01J 2/10; B01F 7/30; B01F 7/00208; A01K 5/002; B02C 18/00
USPC .......... 366/288, 244, 309; 241/98, 101.8, 123
See application file for complete search history.

(56) References Cited

U.S. PATENT DOCUMENTS

| 1,612,281 | A | * | 12/1926 | Goetz | ............................ 366/244 |
| 4,697,929 | A | * | 10/1987 | Muller | ............................. 366/97 |
| RE33,086 | E | * | 10/1989 | Bru | ................................. 424/44 |
| 5,302,020 | A | * | 4/1994 | Kruse | ............................ 366/288 |

(Continued)

FOREIGN PATENT DOCUMENTS

| EP | 0019594 A1 | 11/1980 |
| EP | 0385956 A1 | 9/1990 |

(Continued)

OTHER PUBLICATIONS

International Search Report dated Jul. 20, 2006.

*Primary Examiner* — Nathan Bowers
*Assistant Examiner* — Gautam Prakash
(74) *Attorney, Agent, or Firm* — Snell & Wilmer L.L.P.

(57) ABSTRACT

A kneading and granulating machine comprises: a container containing a material to be kneaded; a kneading member, which moves along the inner wall surface of the container and revolves and spins at the same time within the container; and a crushing blade, which revolves and spins at the same time within the container to shear the material to be kneaded in the container. The kneading member comprises a blade having a shape corresponding to the inner wall surface of the container, which enables kneading the material to be kneaded between itself and the inner wall surface of the container.

21 Claims, 8 Drawing Sheets

(56) References Cited

U.S. PATENT DOCUMENTS 5,683,178 A * 11/1997 Nakamoto et al. ......... 366/325.3
6,227,697 B1 * 5/2001 Stahl ............................ 366/288
2004/0159007 A1 8/2004 Knorr et al.

FOREIGN PATENT DOCUMENTS

| JP | 3035906 | 4/1997 |
| JP | 2000-354753 | 12/2000 |
| JP | 2002-346598 | 3/2002 |

* cited by examiner

KNEADING AND GRANULATING MACHINE

CROSS-REFERENCE TO RELATED APPLICATIONS

This application is U.S. national phase filing under 35 U.S.C. §371 of PCT/JP2006/302672 filed Feb. 6, 2006, and claims priority from Japanese Application No. 2005-033473 which was filed on Feb. 9, 2005.

TECHNICAL FIELD

The present invention relates to a kneading and granulating machine for kneading and granulating a target material to make products such as pharmaceutical preparations, food products, cosmetic preparations and the like. In particular, the present invention relates to a kneading and granulating machine performing kneading, mixing, granulation and the like of powder or particles in one step within a container.

BACKGROUND ART

Conventionally, an extrusion method is generally used for granulating powder having the strong adhesion. However, when using said method, it is necessary to perform unit operations such as mixing of powder with a binding material, kneading, granulation, conglobation and the like independently. As a result, the number of processes is increased and it takes much time to carry out such processes, and therefore, there is a drawback that the manufacturing cost is increased.

For example, Japanese Laid-Open Publication No. 2000-354753 discloses a mixing and granulating machine comprising: a container 55 containing powder; a rotating blade 56, which rotates at the bottom portion of the container to revolve and flow the powder; and a crushing blade 57, which rotates in the revolving and flowing powder to shear it, wherein the crushing blade 57 is revolved along the inner circumferential surface of the container 55, in order to carry out mixing of the powder, agitating thereof and the like in one step, as shown in FIG. 10.

In this mixing and granulating machine, the rotating blade 56 has a shape by which the powder is kicked up when the rotating blade 56 rotates. A raw powder charged in the container 55 is kicked up by the rotating blade 56 and is convected. In the convection current of the powder, a binding agent is added dropwise or sprayed from a nozzle 58, and the crushing blade 57 shears the granulated material in the convection current to prevent segregation and the like.

Thus, though a conventional mixing and granulating machine can kick up and shear powder at the time of granulation, kneading actions are not sufficiently provided, and therefore, it is difficult to adjust strength and an elution state of a granulated material. Further, since the adhesion of a material to the container is significantly high, it takes time to remove the material therefrom, and as a result, the productivity is decreased. Furthermore, there is a drawback that particles (granulated material) are not formed when a hardly-soluble (slightly soluble) drug is contained.

Japanese Utility Model Registration No. 2521765 discloses a mixing and granulating machine, wherein: a lower blade and an upper blade are rotatably arranged in a tank; the lower blade is arranged to provide a narrow gap between itself and the bottom of the tank; a material to be treated in a tank is lifted up and moved toward the center of the tank by the lower blade; and the material to be treated is given the shearing force by the upper blade, which rotates at a high speed, and is mixed at the same time to be granulated.

Further, Japanese Publication for Opposition No. 6-24619 discloses a granulating machine comprising: a tubular container; a low speed rotor equipped with a mixing member in proximity to the inner circumferential surface of the container; and two high speed rotors comprising many impact members.

However, similarly, in these mixing and granulating machines, kneading actions are not sufficiently provided, and therefore, it is difficult to adjust strength and an elution state of a granulated material. Further, since the adhesion of a material to the container is significantly high, it takes time to remove the material therefrom, and as a result, the productivity is decreased.

DISCLOSURE OF THE INVENTION

The kneading and granulating machine of the present invention comprises: a container for containing a material to be kneaded and granulated; a kneading member, which moves along the inner wall surface of the container and revolves and spins at the same time within the container; and a crushing blade, which revolves and spins at the same time within the container to shear the material to be kneaded in the container, wherein the kneading member comprises a blade having a shape corresponding to the inner wall surface of the container, which enables kneading the material to be kneaded between itself and the inner wall surface of the container. The above-described purposes of the present invention are attained by these structures.

In one embodiment of the present invention, the kneading member and the crushing blade can be adjusted in terms of the revolving speed and the spinning speed independently, and the revolving speed, the rotational speed of the kneading member and the rotational speed of the crushing blade can be changed optionally.

In one embodiment of the present invention, the direction of the rotation of the kneading member, which revolves and spins at the same time, and the direction of the rotation of the crushing blade, which revolves and spins at the same time, can be respectively set as a normal rotation or a reverse rotation to the direction of revolution.

In one embodiment of the present invention, the rotation locus of the kneading member moves along the inner wall surface of the container.

In one embodiment of the present invention, the material to be kneaded comprises powder and a binding solution, and a nozzle for the binding solution to be put into the container is provided at the upper portion of the container.

In one embodiment of the present invention, the container comprises a dryer in a vacuum or under a reduced pressure.

In another embodiment of the present invention, a kneading and granulating machine comprises: a container containing a material to be kneaded comprising powder and a binding solution; a kneading member, which moves along the inner wall surface of the container and revolves and spins at the same time within the container; and a crushing blade, which revolves and spins at the same time within the container to shear the material to be kneaded in the container, wherein: the kneading member comprises a blade having a shape corresponding to the inner wall surface of the container, which enables kneading the material to be kneaded between itself and the inner wall surface of the container; the binding solution is dispersed forcedly and instantly into the powder by the kneading/shearing action provided by the kneading member; and the kneaded material in which the binding solution is dispersed is crushed by the action provided by the crushing blade to prepare the granulated material with a suitable size.

The kneading and granulating machine of the present invention comprises: a container containing a material to be kneaded; a kneading member, which moves along the inner wall surface of the container and revolves and spins at the same time within the container; and a crushing blade, which revolves and spins at the same time within the container to shear the material to be kneaded in the container, wherein the kneading member comprises a blade having a shape corresponding to the inner wall surface of the container, which enables kneading the material to be kneaded between itself and the inner wall surface of the container. Therefore, a binding solution can be dispersed forcedly and instantly into a hardly-soluble powder by the kneading/shearing action provided by the kneading member. Further, the kneaded material in which the binding solution is dispersed can be crushed by the action provided by the crushing blade to prepare the granulated material with a suitable size.

Therefore, mixing, kneading, granulation and conglobation of the material to be kneaded can be carried out in one step within a closed container and within a very short time (2 to several minutes), and accordingly, a significant decrease of the manufacturing cost is expected.

In addition, since there is almost no adhesion of the granulated material to the inner wall surface of the container, physical properties such as the viscosity and the solubility of the material to be kneaded can be controlled optionally, and conglobation of the granulated material can be carried out. Further, drying in a vacuum or under a reduced pressure can also be carried out.

Moreover, since cross-contamination can be prevented, the present invention is suitable for the measure for GMP, which is a problem in the field of pharmaceuticals and food products.

Furthermore, the granulated material having a spherical shape with an averaged particle size distribution can be produced within a very short time, and physical properties such as the particle diameter and the density can be controlled freely by adjusting the operational conditions (rotational speed of a blade, operating time and the like).

As described above, a binding solution (e.g., water), even in the case of making drugs which are hardly-soluble in water, can be dispersed forcedly into a drug powder by the strong shearing action provided by the kneading blade. In addition, due to the crushing action by, for example, a chopper, a kneaded material containing the dispersed binding solution can be crushed and granulated. The granulation scale and other properties, such as shape, density, dissolution rate, of a granulated material can be adjusted by the crushing blade. Therefore, granulated drugs can be made within a small amount of time.

Further, since the binding solution (e.g., water) is quickly and uniformly dispersed into the granulated material, a particle size distribution of the granulated material is extremely narrow (i.e., a particle diameter is leveled).

Even when producing a granulated material which easily adheres to the inner wall surface of the container, there is almost no adhesion of the granulated material to the inner wall surface of the container since a kneaded material containing the dispersed binding solution is crushed and granulated quickly due to the action provided by the crushing blade after the binding solution has been dispersed forcedly into a powder.

BEST MODE FOR CARRYING OUT THE INVENTION

Hereinafter, the embodiment of the present invention is concretely described.

Figure 1:
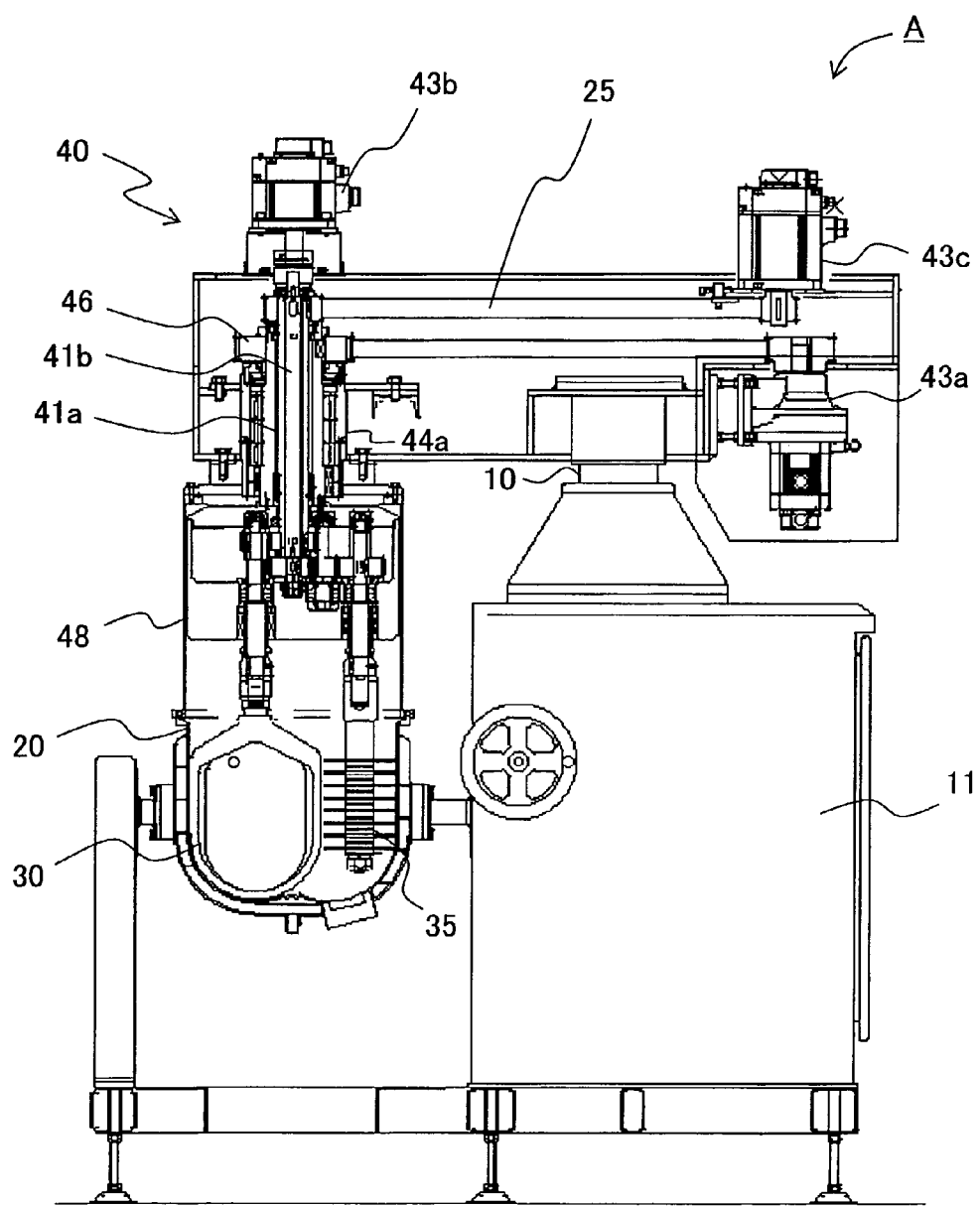
FIG. 1 is a cross sectional view showing one embodiment of the kneading and granulating machine of the present invention.
Figure 2:
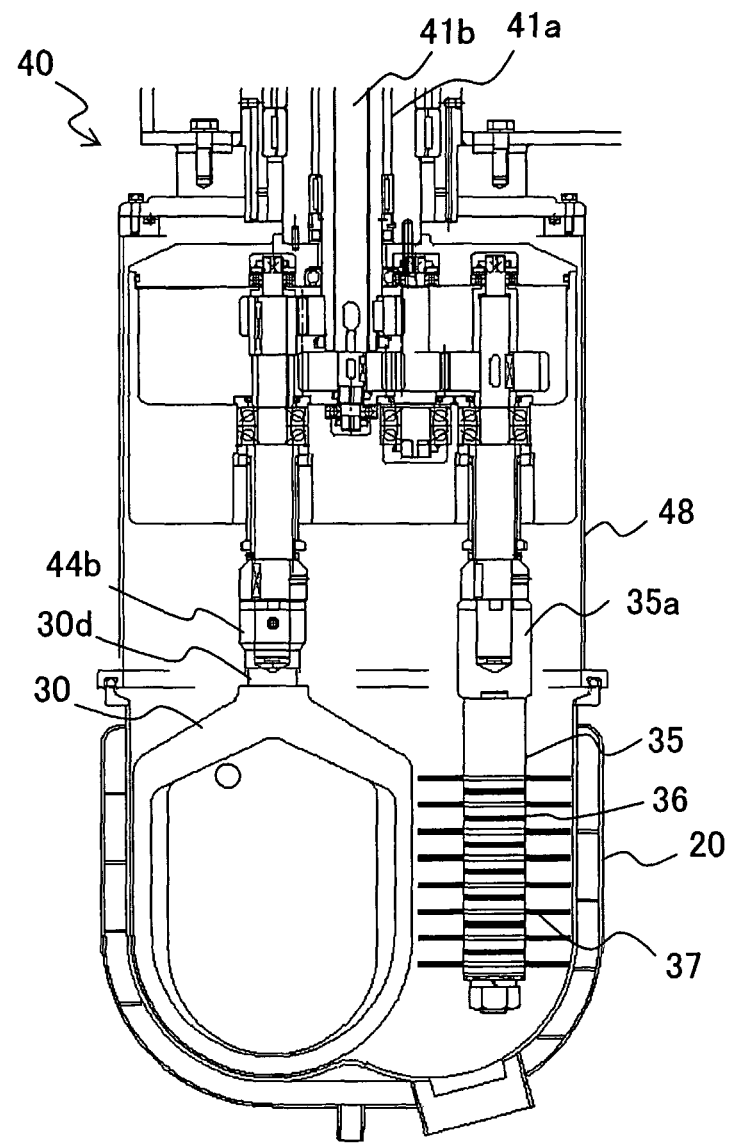
FIG. 2 is a vertical cross-sectional view showing the structure of the main part of the kneading and granulating machine shown in FIG. 1.
Figure 3:
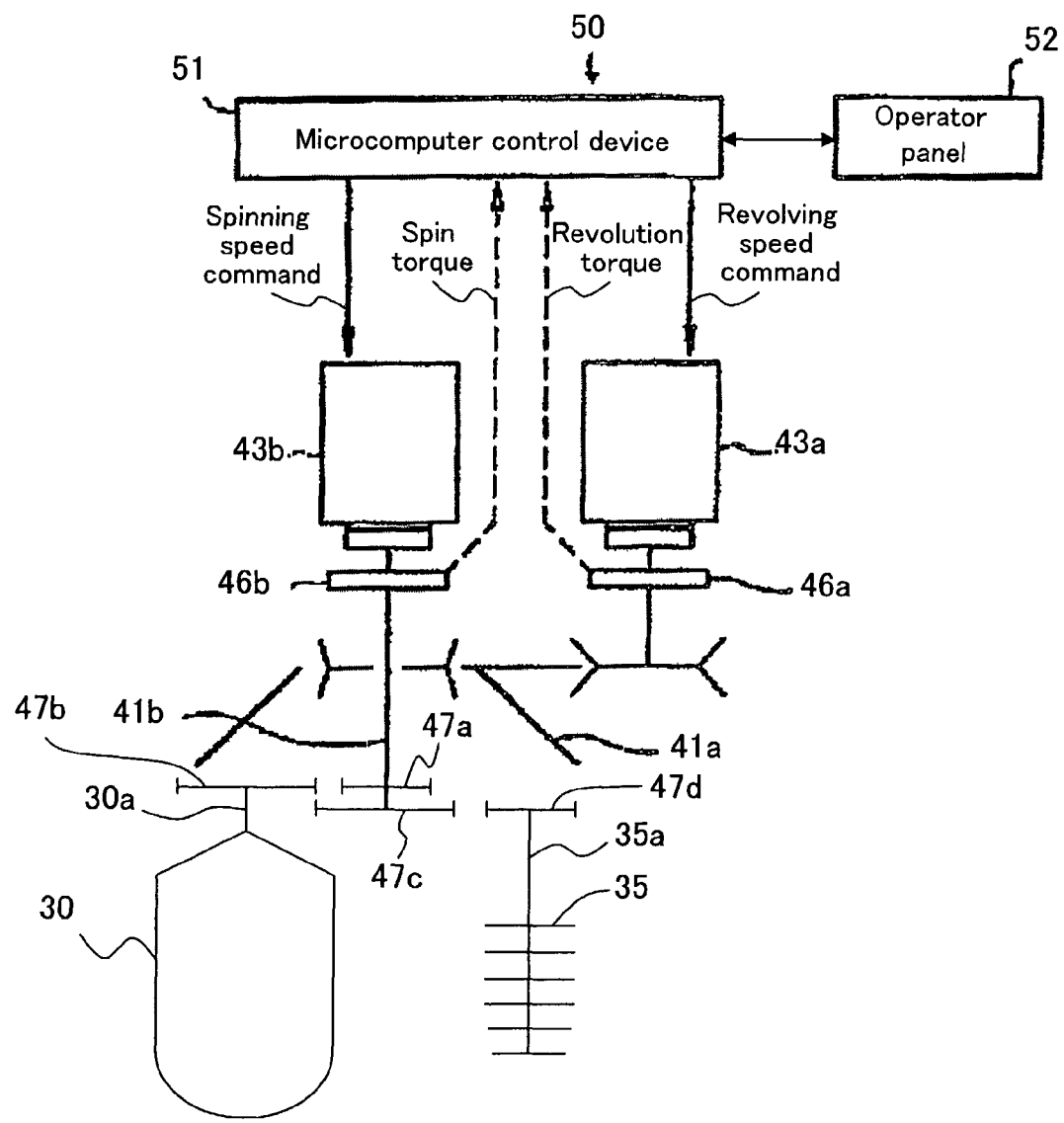
FIG. 3 is a schematic view of the kneading and granulating machine.
Figure 4:
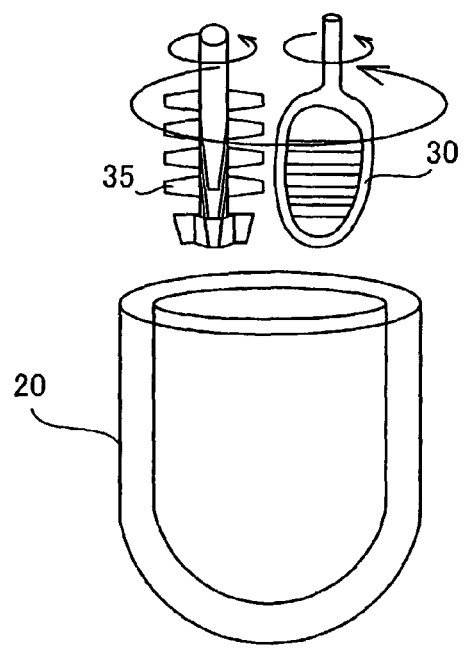
FIG. 4 is a diagram of the main part of the kneading and granulating machine.

As shown in FIGS. 1 and 2, a kneading and granulating machine A of the present embodiment comprises: a container 20 for receiving, kneading, crushing and granulating a material to be kneaded; a pedestal 11 for supporting the container 20, which can be overturned; an elevating member 10 capable of elevating from the upper portion of the pedestal 11; a plurality of motors 43 attached to the elevating member 10; and a power transmission system 25 for transmitting the power of the motors 43 to a kneading member 30 and a crushing blade 35 disposed in the container 20.

The container 20 comprises a heater for heating the inside thereof, and also comprises a dryer and the like for vacuating or decompressing the inside thereof.

The above-described kneading member 30, which is mainly used for agitating, mixing, kneading and granulating, moves along the inside wall surface of the container 20, and revolves and rotates at the same time within the container 20. The above-described crushing blade 35 is used for shredding and rotates at a high speed. The crushing blade 35 also revolves in the container 20 while spinning to shear a material to be kneaded in the container 20.

For each of the parts, the revolving speed and the spinning speed can be regulated independently. The revolving speed, the rotational speed of the kneading member 30 and the rotational speed of the crushing blade 35 can be changed optionally. When the state of kneading is desired to be enhanced, the shape of the kneading member 30 can be changed so as to allow the member to press powder against the wall surface of the container 20 as much as possible. The shape of the cutting edge of the crushing blade 35 can also be changed to various kinds of shapes depending on the shearing force required. The direction of the rotation of the kneading member 30 and the direction of the rotation of the crushing blade 35 can be respectively set as a normal rotation or a reverse rotation to the direction of revolution. Degrees of elution and abrasion of a granulated material can be regulated by regulating the degree of kneading.

The shape of the kneading member 30 corresponds to the shape of the inside surface of the container 20. The rotation locus of the kneading member 30 provides an acute angle to the sidewall surface of the container 20 depending on the ratio between the revolving speed and the spinning speed, and action is provided to press raw powder, and therefore, strong mixing action can be added. Inversely, mixing action can be weakened when the rotation locus of the kneading member 30 is in contact with the circumference of the sidewall surface of the container 20. However, such conditions depend on the shape of the kneading member 30. The degree of kneading can be further increased and decreased by changing the shape of the kneading member 30.

The spinning speed used herein refers to the rotational speed of the kneading member 30 and the crushing blade 35. The rotational speed of the kneading member 30 and the rotational speed of the crushing blade 35 can be set independently. By changing the spinning speed of the kneading member 30, mixing conditions and a kneaded state of raw powder can be adjusted. The rotational speed of the crushing blade 35 can be optionally set so that the effective shearing force is provided without depending on the revolving speed and the rotational speed of the kneading member 30.

The kneading member 30 has a blade with a shape corresponding to the inner wall surface of the container 20 so that a material to be kneaded can be kneaded between the kneading member 30 and the inner wall surface of the container 20.

Figure 5:
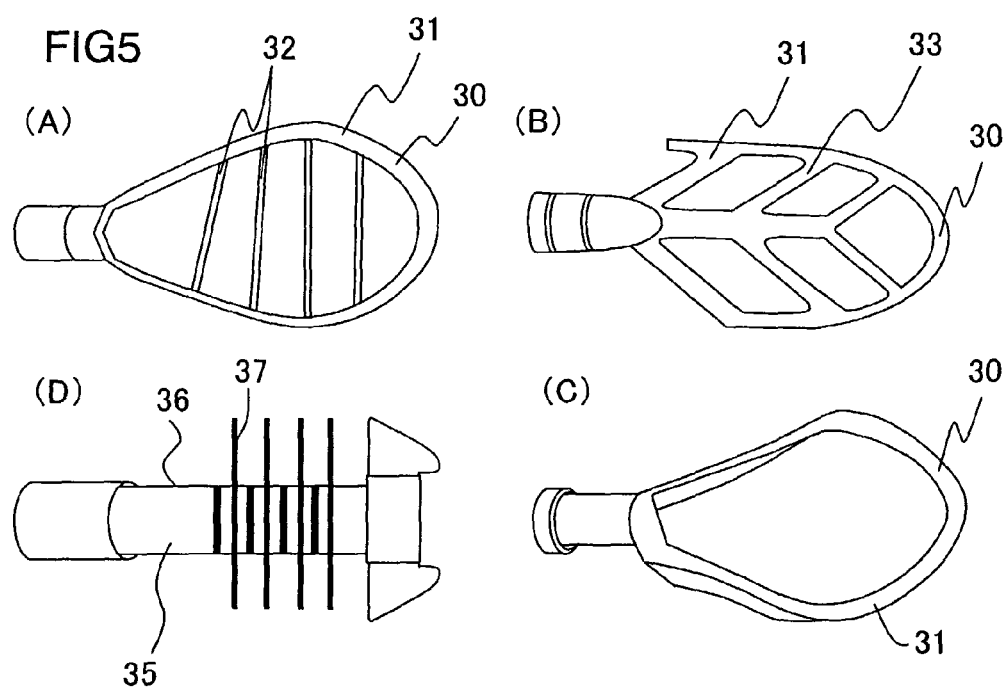
FIG. 5 is a perspective view of the kneading member and the crushing blade.

For example, various types of members, as shown in FIG. 5, can be used as the kneading member 30. The kneading member 30 shown in FIG. 5(A) is structured by an elliptical outer member 31 with a plurality of transverse members 32 erected in parallel therein. The outer member 31 is a little bit twisted. A member shown in FIG. 5(B) is made by an elliptical outer member 31 with a plurality of oblique members 33 provided thereto, wherein they are tilted downward from the center portion of the outer member 31. A member shown in FIG. 5(C) is structured only by an elliptical outer member 31, which is twisted so that it provides a dog-legged shape in a side elevational view.

Figure 7:
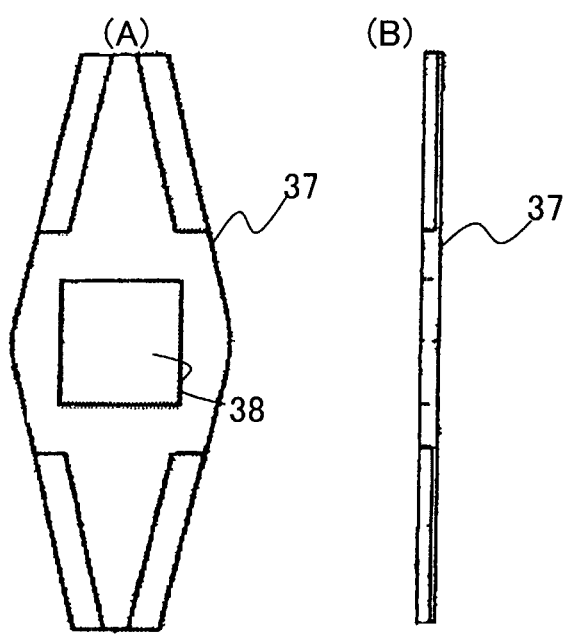
FIG. 7 is a plan view and a cross sectional view of the blade member.

As shown in FIG. 5(D), the crushing blade 35 comprises a center shaft 36 with a plurality of parallel blades 37 attached thereto to be perpendicular to the axial direction. In order to attach the parallel blades 37 to the center shaft 36, as shown in FIG. 7, the center shaft 36 is inserted through an opening 38, which is formed in the center of the parallel blade 37, and a plurality of the blades are attached with a spacer provided between two blades. Further, a small blade member may be attached to the bottom portion of the center shaft 36 so that the blade member is parallel to the axial direction.

Next, the driving system of the kneading member 30 and the crushing blade 35 will be explained below.

In order to fix a mixing section 40 to the upper portion of the container 20 and to subject the kneading member 30 and the crushing blade 35 to the sun-and-planet motion, these mixing apparatuses (the kneading member 30 and the crushing blade 35) are attached to off-center positions to provide a vertical mixer. As described above, the shapes of the kneading member 30 and the crushing blade 35 can be changed depending on a purpose. Further, the revolving speed and the rotation coefficient of them can also be freely adjusted. When the rotation coefficient is near an irrational number, no dead point is generated, and therefore, granulation can be carried out within a short time.

The driving section 40 comprises: a sleeve type revolution drive shaft 41a arranged concentrically to the apparatus center; a spin drive shaft 41b inserted through the inside of the revolution drive shaft 41a; a first drive source 43a, which drives the revolution drive shaft 41a and a plurality of (two) spinning shafts 30a and 35a connected to the bottom portion of the revolution drive shaft 41a; a second drive source 43b driving the spin drive shaft 41b; and a control means 50 for controlling the first drive source 43a and the second drive source 43b. The kneading member 30 and the crushing blade 35 are respectively connected to the bottom portion of the spinning shaft 30a and the bottom portion of the spinning shaft 35a.

The sleeve type revolution drive shaft 41a is rotatably supported via a shaft bearing inside a sleeve type bracket 44a that is fixed to the elevating member 10. The first drive source 43a driving the revolution drive shaft 41a is a motor, wherein a direction of rotation and a rotational speed can be changed, that is, a motor, wherein a rotational speed can be changed positively and negatively. The revolution drive shaft 41a can be driven in any direction and at any speed by being connected to a pulley 46, which is attached to the upper portion of the revolution drive shaft 41a, via a torque sensor 46a.

The spin drive shaft 41b, which is inserted through the inside of the sleeve type revolution drive shaft 41a, is rotatable independent of the revolution drive shaft 41a with a shaft bearing. The second drive source 43b driving the spin drive shaft 41b is a motor, wherein a direction of rotation and a rotational speed can be changed, that is, a motor, wherein a rotational speed can be changed positively and negatively, and is provided above the spin drive shaft 41b. The spin drive shaft 41b can be driven in any direction and at any speed by connecting the second drive source 43b with the spin drive shaft 41b via a torque sensor 46b.

A plurality of the spinning shafts 30a and 35a connected to the bottom portion of the revolution drive shaft 41a are perpendicularly positioned around the apparatus center. The spinning shafts 30a and 35a are connected to the bottom portion of the revolution drive shaft 41a with a bracket 44b, in which the spinning shafts 30a and 35a are respectively supported rotatably with a shaft bearing, and a gear 47b, which is fitted to the spinning shafts 30a and 35a, is engaged with a gear 47a, which is attached to the bottom portion of the spin drive shaft 41b, to be connected to the spin drive shaft 41b.

The kneading member 30 is connected to the bottom of the spinning shaft 30a. The crushing blade 35 is similarly connected to the bottom of the spinning shaft 35a via gears 47c and 47d.

Reference number 48 indicates a hood attached to the elevating member 10 to cover the bracket 44b. The hood is also a lid body to block an opening of the container 20, and comprises an observation hole for observing the inside of the container 20, an exhaust pipe for vacuum pumping of the container 20 and the like.

In said driving section 40, when the revolution drive shaft 41a is driven for revolution by the first drive source 43a, the revolution is transmitted to the spinning shafts 30a and 35a via the bracket 44b, and the spinning shafts 30a and 35a thereby revolve around the apparatus center. Further, when the spin drive shaft 41b is driven for spin by the second drive source 43b, the spin is transmitted to the spinning shafts 30a and 35a respectively via the gears 47a-47d, and the spinning shafts 30a and 35a thereby spin independently.

Therefore, the kneading member 30 and the crushing blade 35 perform the "sun-and-planet motion", that is, revolve and spin at the same time. Moreover, since the direction and the speed of rotation of the first drive source 43a and the direction and the speed of rotation of the second drive source 43b are controlled independently, the direction and the speed of the revolution action and the spin action are controlled independently in terms of the kneading member 30 and the crushing blade 35, and thereby enabling control of the operation speed and the rotation coefficient. Further, a revolution torque and a spin torque of the kneading member 30 are detected from outputs of the torque sensors 46a and 46b.

The control means 50, which controls the first drive source 43a and the second drive source 43b, is equipped with a microcomputer control device 51 and an operation panel 52. These devices are received in the pedestal 11 of the elevating member 10. The microcomputer control device 51 is equipped with a CPU, a ROM, a RAM and the like, and carries out processing according to a program stored in the ROM.

The first drive source 43*a* and the second drive source 43*b* are respectively given a rotation direction command and a rotation speed command based on revolution torque information and spin torque information of the kneading member 30 and the crushing blade 35 provided by the torque sensors 46*a* and 46*b*.

Figure 6:
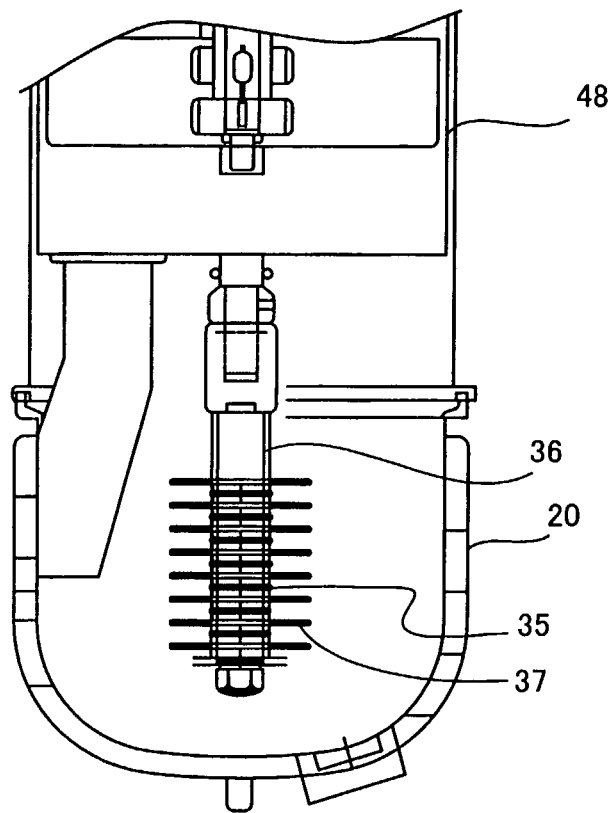
FIG. 6 is a cross sectional view of the kneading and granulating machine equipped with a scraper.

Further, as shown in FIG. 6, a blade 35 may be provided to gyrate in contact with the inner circumferential surface of the upper end portion of the container 20 to enable the operation of scraping the inner circumferential surface of the upper end portion of the container 20 as well as the inner bottom surface thereof.

Figure 8:
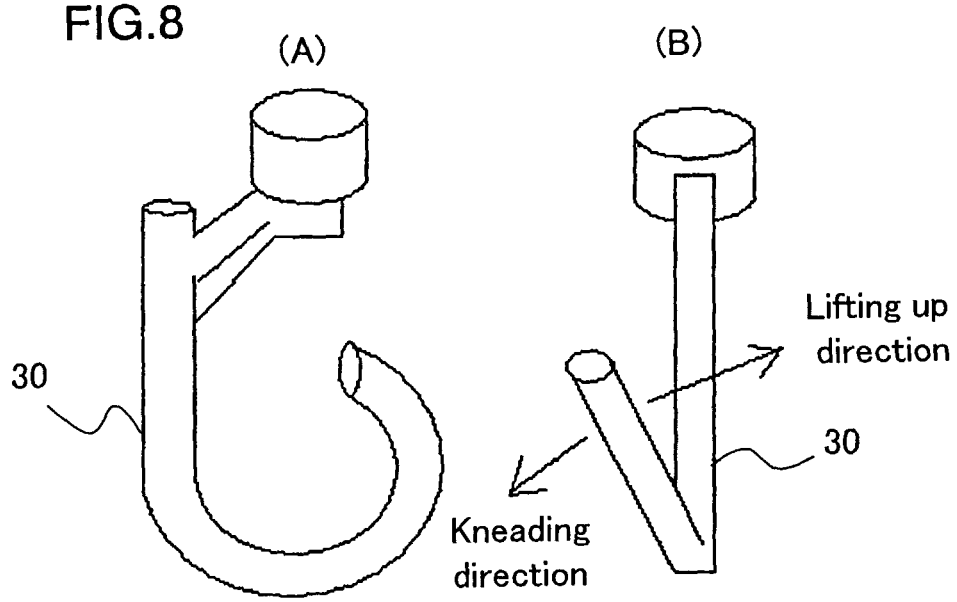
FIG. 8 is a perspective view of the kneading member.
Figure 9:
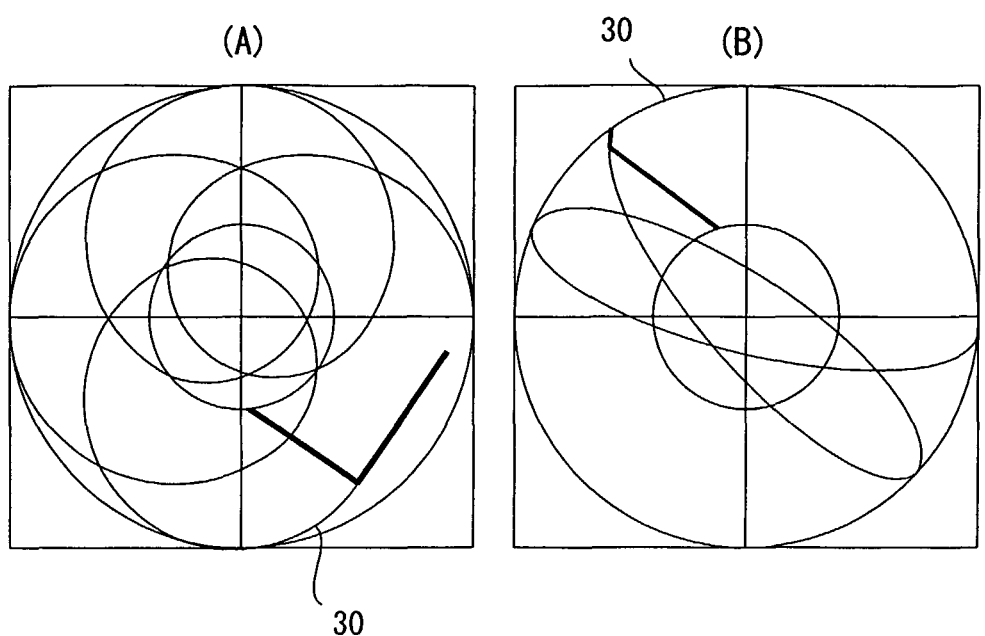
FIG. 9 is a locus chart of the kneading member in the sun-and-planet motion.
Figure 10:
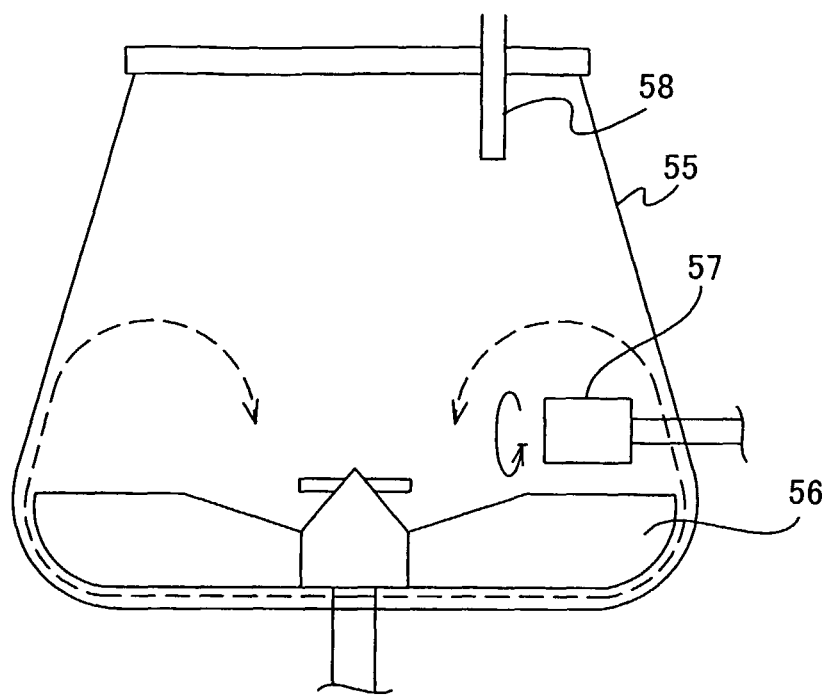
FIG. 10 is a diagram of a mixing and granulating machine of the prior art.

The kneading member 30 may be one as shown in FIG. 8. In this case, the movement of the kneading member 30 can be optionally selected from: the revolution movement only (the rotation coefficient=0); the movement Q as shown in FIG. 9A (the rotation coefficient >0); or the movement r as shown in FIG. 9B (the rotation coefficient >0).

The combination of a sprocket and a chain is used in a kneading and granulating machine for the transmission of rotation. Alternatively, the combination of a pulley and a belt may also be used therein.

Industrial Applicability

The kneading and granulating machine according to the invention is capable of easily adjusting strength and an elution state of a granulated material. The kneading and granulating machine according to the present invention is capable of producing a uniform size of granulated material within a short time, preventing the adhesion to the inner wall surface of a container.

The invention claimed is:

1. A kneading and granulating machine comprising:
a container for containing a material to be kneaded;
a kneading member, which moves along the inner wall surface of the container and revolves and spins at the same time within the container; and
a chopper, which revolves and spins at the same time within the container to shear the material to be kneaded in the container,
the container including the inner wall surface and an inner bottom surface,
wherein the kneading member comprises a blade having a shape corresponding to the inner wall surface and the inner bottom surface of the container, and configured to enable kneading of the material to be kneaded between itself and the inner wall surface and the inner bottom surface of the container by pressing the material to be kneaded to the inner wall surface and the inner bottom surface of the container with the kneading member,
wherein the rotation locus of the kneading member moves along the inner wall surface of the container;
wherein the revolution speed and the spinning speed for each of the kneading member and the chopper is regulated independently,
wherein the material to be kneaded comprises powder and a binding solution, and
wherein the kneading and granulating machine comprises a driving section fixed to the upper portion of the container, the driving section comprising a sleeve revolution drive shaft, a spin drive shaft inserted through the inside of the revolution drive shaft, two spinning shafts connected to the bottom portion of the revolution drive shaft, a first drive source driving the revolution drive shaft, a second drive source driving the spin drive shaft, and control microcomputer for controlling the first drive source and the second drive source,
wherein the kneading member and the chopper are respectively connected to the bottom of the spinning shafts,
wherein a nozzle for the binding solution to be put into the container is provided at the upper portion of the container,
wherein the container further comprises a dryer in a vacuum or under a reduced pressure,
wherein the kneading and granulating machine is configured to carry out mixing, kneading, granulating and conglobation of the material in one single step, and
wherein the first drive source and the second drive source are each a motor.

2. The kneading and granulating machine according to claim 1, wherein the kneading member and the chopper are adjusted in terms of the revolving speed and the spinning speed independently, and the revolving speed, the rotational speed of the kneading member and the rotational speed of the chopper are changed.

3. The kneading and granulating machine according to claim 1, wherein the direction of the rotation of the kneading member, which revolves and spins at the same time, and the direction of the rotation of the chopper, which revolves and spins at the same time, is respectively set as a normal rotation and a reverse rotation to the direction of revolution.

4. The kneading and granulating machine according to claim 1, wherein the kneading member moves along the inner wall surface and an inner bottom surface of the container.

5. The kneading and granulating machine according to claim 1, wherein the rotation speed of the chopper is set so that the shearing force is provided without depending on the revolving speed and the rotational speed of the kneading mummer.

6. The kneading and granulating machine according to claim 1, wherein the direction and the speed of the revolution action and the spin action are controlled independently in terms of the kneading member and the chopper.

7. The kneading and granulating machine according to claim 1, wherein a direction of rotation and a rotation speed of the revolution drive shaft are changed and wherein a direction of rotation and a rotation speed of the spin drive shaft are changed.

8. The kneading and granulating machine according to claim 1, wherein the machine is used for carrying out mixing, kneading, granulating and conglobation of the material to be kneaded in the container.

9. The kneading and granulating machine according to claim 1, wherein the machine further comprises a third motor.

10. A kneading and granulating machine comprising:
a container containing a material to be kneaded comprising powder and a binding solution;
a kneading member, which moves along the inner wall surface of the container and revolves and spins at the same time within the container; and
a chopper, which revolves and spins at the same time within the container to shear the material to be kneaded in the container,
the container including the inner wall surface and an inner bottom surface,
wherein:
the kneading member comprises a blade having a shape corresponding to the inner wall surface and the inner bottom surface of the container, and configured to enable kneading of the material to be kneaded between itself and the inner wall surface and the inner bottom surface of the container by pressing the material to be kneaded to the inner wall surface and the inner bottom surface of the container with the kneading member, wherein the rotation locus of the kneading member moves along the inner wall surface of the container, the binding solution is dispersed forcedly and instantly into the powder by the kneading and shearing action provided by the kneading member; and the kneaded material in which the binding solution is dispersed is crushed by the action provided by the chopper to prepare the granulated material with a suitable size, wherein the kneading member comprises an elliptical outer member having a shape corresponding to the inner wall surface of the container, wherein the elliptical outer member is twisted, wherein the rotation locus of the kneading member provides an acute angle to the sidewall surface of the container, and wherein the kneading and granulating machine comprises a driving section fixed to the upper portion of the container, the driving section comprising a sleeve revolution drive shaft, a spin drive shaft inserted through the inside of the revolution drive shaft, two spinning shafts connected to the bottom portion of the revolution drive shaft, a first drive source driving the revolution drive shaft, a second drive source driving the spin drive shaft, and a control microcomputer for controlling the first drive source and the second drive source, wherein the kneading member and the chopper are respectively connected to the bottom of the spinning shafts, wherein a nozzle for the binding solution to be put into the container is provided at the upper portion of the container, wherein the container further comprises a dryer in a vacuum or under a reduced pressure, wherein the kneading and granulating machine is configured to carry out mixing, kneading, granulating and conglobation of the material in one single step, and wherein the first drive source and the second drive source are each a motor.

11. The kneading and granulating, machine according to claim 10, wherein the kneading member moves along the inner wall surface and an inner bottom surface of the container.

12. The kneading and granulating machine according to claim 10, wherein the kneading member and the chopper are adjusted in terms of the revolving speed and the spinning speed independently, and the revolving speed, the rotational speed of the kneading member and the rotational speed of the chopper are changed.

13. The kneading and granulating machine according to claim 10, wherein the direction of the rotation of the kneading member, which revolves and spins at the same time, and the direction of the rotation of the chopper, which revolves and spin at the same time, is respectively set as a normal rotation and a reverse rotation to the direction of revolution.

14. The kneading and granulating machine according to claim 10, wherein a direction of rotation and a rotation speed of the revolution drive shaft are changed, and wherein a direction of rotation and a rotation speed of the spin drive shaft are changed.

15. The kneading and granulating machine according to claim 10, wherein the machine is used for carrying out mixing, kneading, granulating and conglobation of the material to be kneaded in the container.

16. The kneading and granulating machine according to claim 10, wherein the machine further comprises a third motor.

17. A kneading and granulating machine comprising:
a container for containing a material to be kneaded;
a kneading member, which moves along the inner wall surface of the container and revolves and spins at the same time within the container; and
a chopper, which revolves and spins at the same time within the container to shear the material to he kneaded in the container,
the container including the inner wall surface and an inner bottom surface,
wherein the kneading member comprises a blade having a shape corresponding to the inner wall surface and the inner bottom surface of the container, and configured to enable kneading of the material to he kneaded between itself and the inner wall surface and the inner bottom surface of the container by pressing the material to be kneaded to the inner wall surface and the inner bottom surface of the container with the kneading member,
wherein the rotation locus of the kneading member moves along the inner wall surface of the container;
wherein the material to be kneaded comprises powder and a binding solution,
wherein the kneading and granulating machine comprises a driving section fixed to the upper portion of the container, the driving section comprising a sleeve revolution drive shaft, a spin drive shaft inserted through the inside of the revolution drive shaft, two spinning shafts connected to the bottom portion of the revolution drive shaft, a first drive source driving the revolution drive shaft, a second drive source driving the spin drive shaft, and control microcomputer for controlling the first drive source and the second drive source,
wherein the kneading member and the chopper are respectively connected to the bottom of the spinning shafts,
wherein the driving section is configured to control the revolution speed and the spinning speed such that each of the kneading member and the chopper is regulated independently,
wherein a nozzle for the binding solution to be put into the container is provided at the upper portion of the container,
wherein the container further comprises a dryer in a vacuum or under a reduced pressure,
wherein the kneading and granulating machine is configured to carry out mixing, kneading, granulating and conglobation of the material in one single step, and
wherein the first drive source and the second, drive source are each a motor.

18. The kneading and granulating machine according to claim 17, wherein the chopper comprises a center shaft with a plurality of parallel blades attached perpendicularly to the axial direction.

19. The kneading and granulating machine according to claim 17, wherein the machine is used for carrying out mixing, kneading, granulating and conglobation of the material to be kneaded in the container.

20. The kneading and granulating machine according to claim 17, wherein a direction of rotation and a rotation speed of the revolution drive shaft are changed, and wherein a direction of rotation and a rotation speed of the spin drive shaft are changed.

21. The kneading and granulating machine according to claim 17, wherein the machine further comprises a third motor.

\* \* \* \* \*